(12) United States Patent
Lin et al.

(10) Patent No.: US 11,361,178 B2
(45) Date of Patent: Jun. 14, 2022

(54) COMMUNICATION SYSTEM AND METHOD THEREOF

(71) Applicant: Industrial Technology Research Institute, Hsinchu (TW)

(72) Inventors: Kun-Hsein Lin, Hsinchu (TW); Lih-Guong Jang, Hsinchu (TW); Yi-Yuan Chen, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 17/130,509

(22) Filed: Dec. 22, 2020

(65) Prior Publication Data

US 2022/0147727 A1 May 12, 2022

(30) Foreign Application Priority Data

Nov. 10, 2020 (TW) ................... 109139242

(51) Int. Cl.
*G06K 7/10* (2006.01)
*G06K 7/14* (2006.01)
*G06F 3/14* (2006.01)

(52) U.S. Cl.
CPC .......... *G06K 7/10722* (2013.01); *G06F 3/14* (2013.01); *G06K 7/1413* (2013.01); *G06K 7/1417* (2013.01)

(58) Field of Classification Search
CPC ............. G06K 7/10722; G06K 7/1413; G06K 7/1417; G06F 3/14

(Continued)

(56) References Cited

U.S. PATENT DOCUMENTS

| | | | |
|---|---|---|---|
| 8,531,308 B2 * | 9/2013 | Dickie | G09G 3/001 340/815.4 |
| 8,690,335 B2 | 4/2014 | Okumura et al. | |

(Continued)

FOREIGN PATENT DOCUMENTS

| | | |
|---|---|---|
| CN | 103092338 B | 7/2016 |
| CN | 104871453 B | 8/2017 |

(Continued)

OTHER PUBLICATIONS

Taiwan Office Action dated Sep. 7, 2021 in corresponding Taiwanese Application No. 11020873370.

(Continued)

*Primary Examiner* — Toan C Ly
(74) *Attorney, Agent, or Firm* — Fox Rothschild LLP; Peter F. Corless

(57) ABSTRACT

A communication system and method thereof are provided, which includes: providing a first mask, a second mask, a user device having a screen and a display device having a light code module and a panel, wherein the first mask and the second mask are positioned at different positions of the panel, respectively; providing a light code signal to the panel by the light code module, and providing a first mask signal and a second mask signal by the first mask and the second mask, respectively; and capturing the light code signal plus the first mask signal or the second mask signal from the panel by the user device to obtain a first code according to the combination of the light code signal and the first mask signal or obtain a second code according to the combination of the light code signal and the second mask signal.

20 Claims, 9 Drawing Sheets

(58) Field of Classification Search
USPC .................................................. 235/462.11
See application file for complete search history.

(56) References Cited

U.S. PATENT DOCUMENTS

| | | | |
|---|---|---|---|
| 10,121,513 B2 * | 11/2018 | Martinez | G06K 9/00744 |
| 10,304,151 B2 | 5/2019 | Falkenstem et al. | |
| 10,715,183 B1 * | 7/2020 | Walters | G06T 9/40 |
| 2015/0365621 A1 | 12/2015 | Zhang et al. | |
| 2017/0068448 A1 | 3/2017 | Ghassabian | |
| 2019/0212966 A1 | 7/2019 | Lee et al. | |

FOREIGN PATENT DOCUMENTS

| | | |
|---|---|---|
| CN | 104885382 B | 8/2017 |
| TW | 201435675 A | 9/2014 |
| TW | 201528803 A | 7/2015 |
| TW | 201539328 A | 10/2015 |
| TW | 201828699 A | 8/2018 |
| TW | 201901530 A | 1/2019 |
| TW | I 655867 B | 4/2019 |
| WO | 00/070585 A1 | 11/2000 |

OTHER PUBLICATIONS

Izz et al., Uber-in-Light: Unobtrusive Visible Light Communication Leveraging Complementary Color Channel, IEEE INFOCOM 2016—The 35th Annual IEEE International Conference on Computer Communications; 2016; pp. 1-9.

Yuan et al., "Spatially Varying Radiometric Calibration for Camera-Display Messaging", IEEE Global Conference on Signal and Information Processing; 2013; pp. 763-766.

Sato et al., "Visible light communication systems using blue color difference modulation for digital signage", IEEE 27th Annual International Symposium on Personal, Indoor, and Mobile Radio Communications(PIMRC); 2016; pp. 1-6.

* cited by examiner

COMMUNICATION SYSTEM AND METHOD THEREOF

CROSS-REFERENCE TO RELATED APPLICATIONS

This application claims priority to Taiwan Application Serial No. 109139242, filed on Nov. 10, 2020. The entirety of the application is hereby incorporated by reference herein and made a part of this application.

1. TECHNICAL FIELD

The present disclosure relates to communication technologies, and relates to a communication system and method thereof.

2. BACKGROUND

Revenue of display devices such as digital signages on the current global market is gradually growing. For example, according to a study from Business Wire in the United States, the global market of digital signages has reached 21.9 billion US dollars in 2015. Further, digital signage advertising can affect purchase decisions. For example, 68% of consumers said that digital signage advertising could affect their purchase decisions, and even 45% of consumers pointed out that the combination of digital signages with traditional store advertising would lead to unplanned purchases. Meanwhile, in order to pursue a more complete user experience, digital signages have evolved from increasing screen area to dynamic content play and central control systems and further to current smart interactive digital signages.

Furthermore, Bluetooth wireless communication is a common interactive transmission means between smart phones and digital signages. However, in actual applications, the promotion of digital signages is hindered by lack of directionality in Bluetooth information transmission.

In addition, currently, a digital signage may play a plurality of advertisements at the same time. But a single backlight can only send a single visible light signal or a single group of visible light signals at the same time. Although a plurality of backlights can be used to send a plurality of groups of visible light signals at the same time, they are costly and the overall hardware architecture of digital signage needs to be redesigned, thus greatly increasing the cost of the digital signage.

Therefore, there is a need to provide an innovative communication technology so as to allow a display device (e.g., a digital signage) to have both display and information transmission functions, or avoid increasing the cost of the display device (e.g., a digital signage), or display service content of interest (e.g., advertising content) on a screen of a user device (e.g., a mobile device).

SUMMARY

Taiwan Patent No. 1655867 (or patent family: Chinese Patent Publication No. 109511014A and U.S. Pat. No. 10,510,377 B2), entitled "system and method for combining light code and video," can be referred to for understanding related contents of the present disclosure.

The communication system according to the present disclosure includes: a display device having a panel and a light code module providing a light code signal to the panel; a first mask and a second mask positioned at a first position and a second position of the panel of the display device, respectively, for providing a first mask signal and a second mask signal, respectively; and a user device having a camera and a screen, wherein the camera of the user device captures the light code signal plus the first mask signal or the second mask signal from the panel of the display device, such that the user device obtains a first code according to a combination of the light code signal and the first mask signal or obtains a second code according to a combination of the light code signal and the second mask signal, thereby displaying service content corresponding to the first code or the second code on the screen of the user device.

The user device includes: a camera that captures the light code signal plus the first mask signal or the second mask signal from the display device; a processing module that obtains a first code according to the combination of the light code signal and the first mask signal or obtains a second code according to the combination of the light code signal and the second mask signal captured by the camera from the display device; and a screen that displays the corresponding service content according to the first code or the second code obtained by the processing module.

The communication method according to the present disclosure includes the steps of: providing a first mask, a second mask, a user device having a screen and a display device having a light code module and a panel, wherein the first mask and the second mask are positioned at a first position and a second position of the panel of the display device, respectively; providing a light code signal by the light code module of the display device to the panel, and providing a first mask signal and a second mask signal by the first mask and the second mask, respectively; and capturing the light code signal plus the first mask signal or the second mask signal from the panel of the display device by the user device to obtain a first code according to a combination of the light code signal and the first mask signal or obtain a second code according to a combination of the light code signal and the second mask signal, thereby displaying service content corresponding to the first code or the second code on the screen of the user device.

In order to make the aforementioned features and advantages of the present disclosure more comprehensible and understandable, embodiments are specifically described below in conjunction with the accompanying drawings. In the following detailed description, the additional features and advantages of the present disclosure will be partially explained, and these features and advantages can be understood from the following detailed description, or can be learned by practicing the present disclosure. It should be understood that the foregoing general description and the following detailed description are both exemplary and explanatory, and are not intended to limit the scope of the present disclosure.

BRIEF DESCRIPTION OF THE DRAWINGS

FIGS. 1A and 1B are schematic diagrams showing architecture of a communication system according to the present disclosure, wherein FIG. 1B illustrates a relationship between light codes, masks and codes;

FIGS. 3A, 3B and 4 are schematic diagrams showing an embodiment of a display device and masks (e.g., hardware masks) in the communication system according to the present disclosure, wherein FIG. 3B is a graph showing light transmittance versus wavelength of light for the masks (e.g., hardware masks) according to the present disclosure;

DETAILED DESCRIPTION

The following illustrative embodiments are provided to illustrate the present disclosure, these and other advantages and effects can be apparent to those in the art after reading this specification. It should be noted that all the drawings are not intended to limit the present disclosure. Various modifications and variations can be made without departing from the spirit of the present disclosure.

Figure 1A:
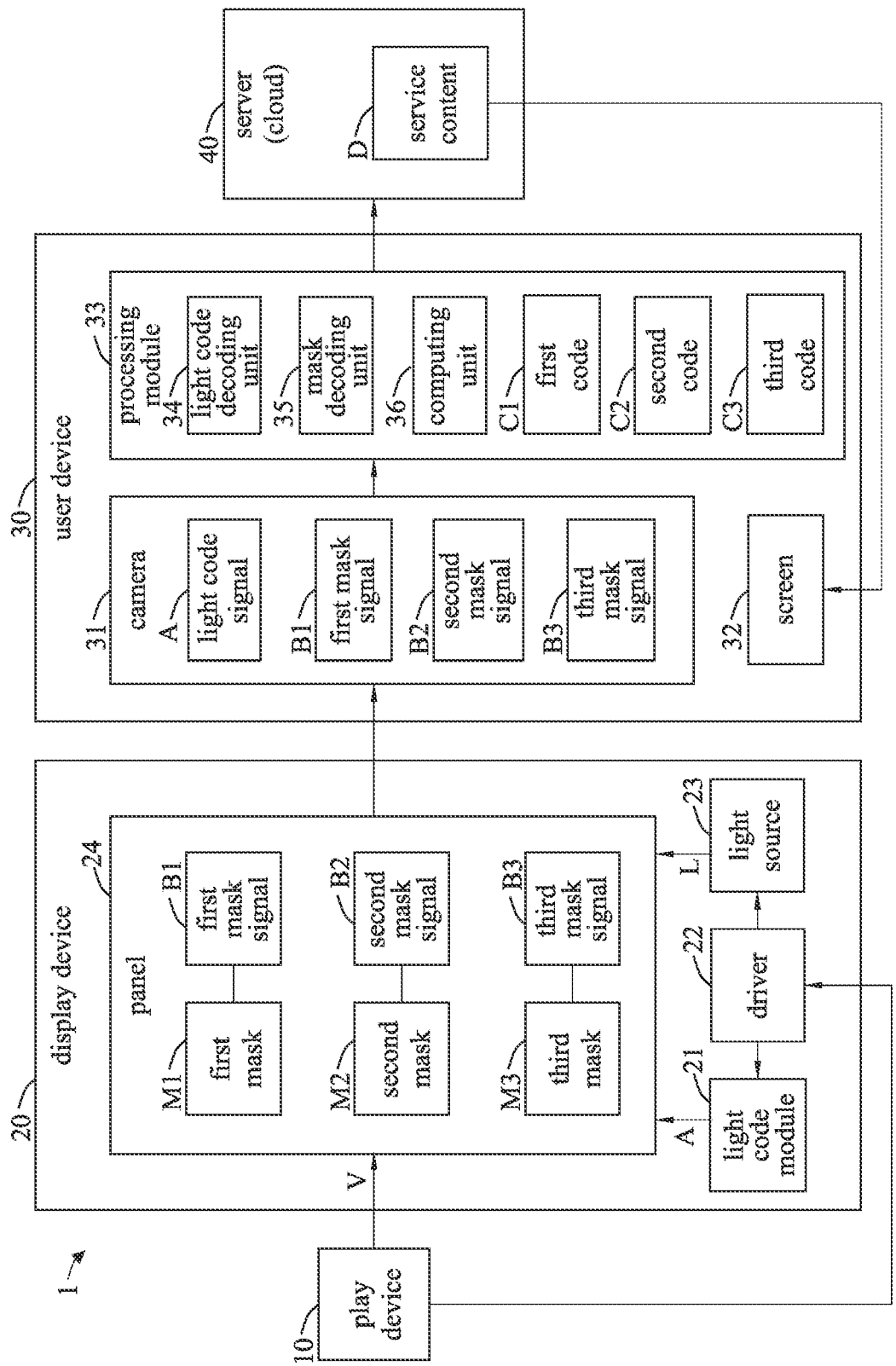
Figure 1B:
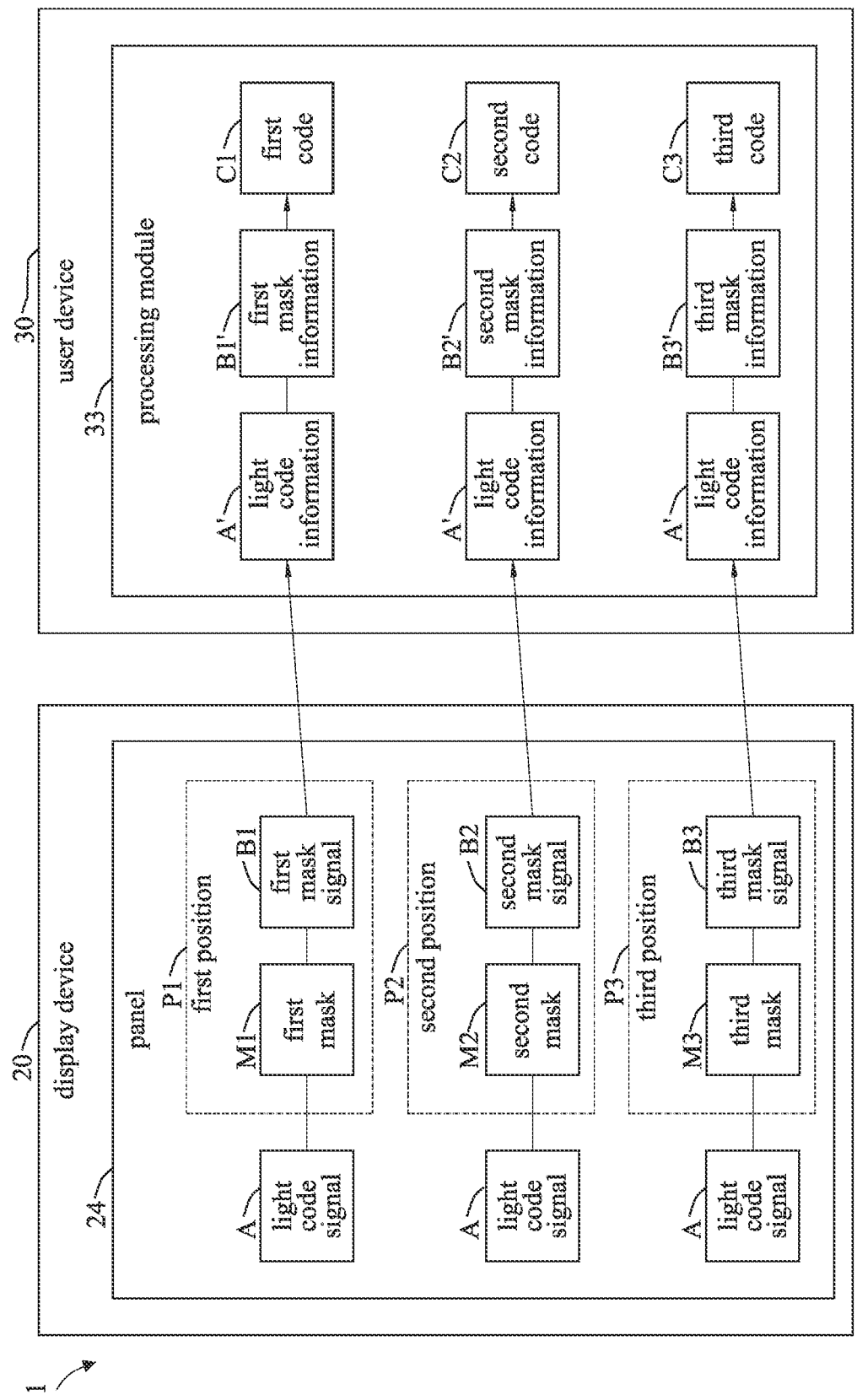
Figure 2:
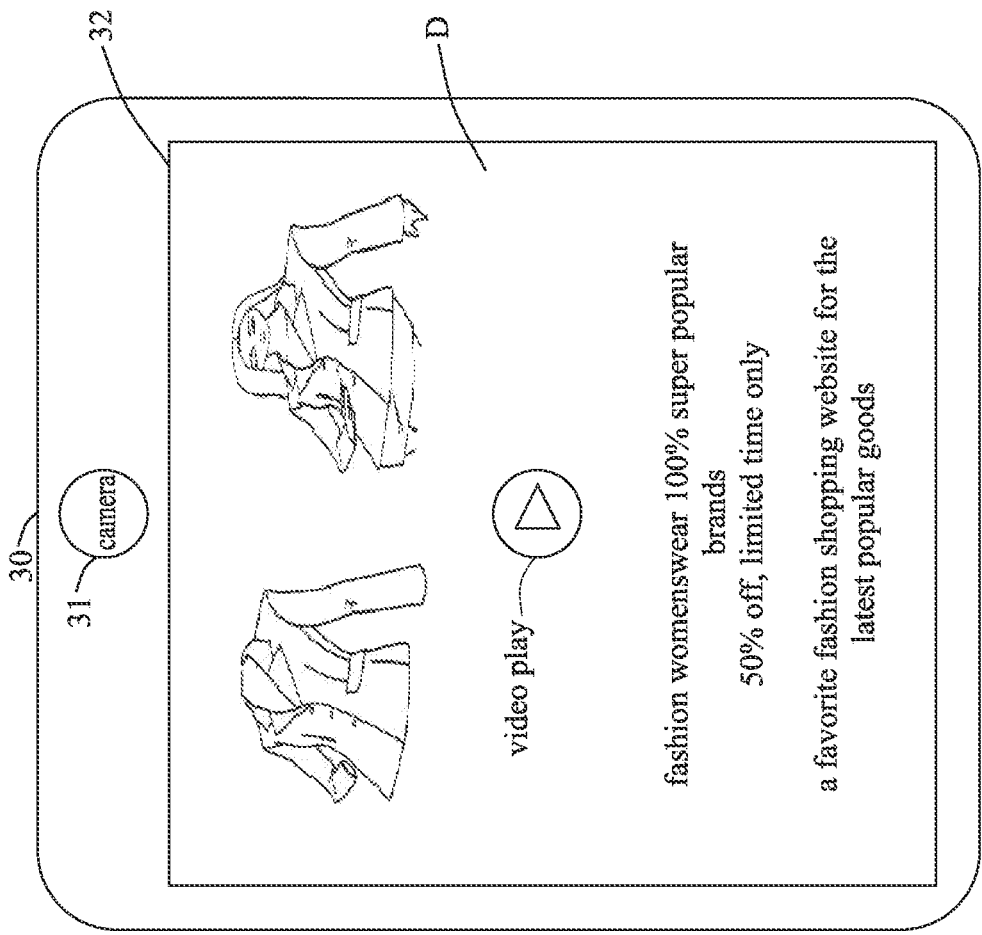
FIG. 2 is a schematic diagram showing an embodiment of service content in the communication system of FIGS. 1A and 1B.

FIGS. 1A and 1B are schematic diagrams showing architecture of a communication system 1 according to the present disclosure. Therein, FIG. 1B illustrates a relationship between light codes, masks and codes. FIG. 2 is a schematic diagram showing an embodiment of service content D in the communication system 1 of FIGS. 1A and 1B. The service content D can be advertising content (advertising information), activity content (activity information), multimedia content (multimedia information) and so on.

The present disclosure provides a communication system and method thereof, which for example, allows a display device (e.g., a digital signage) to have both display and information transmission functions, or avoids increasing the cost of the display device, or displays service content of interest (e.g., advertising content) on a screen of a user device (e.g., a mobile device).

Referring to FIGS. 1A and 1B, the communication system 1 has a play device 10, a display device 20, a user device 30 and a server 40 that are connected in sequence or communicate with one another. Further, the communication system 1 has a plurality of masks. The play device 10 can be a player or transmitter for a video V (program). Further, the play device 10 can control a panel 24 and a driver 22 of the display device 20 synchronously so as to synchronize a picture of the video V displayed on the panel 24 and a light code signal A of a light code module 21 driven by the driver 22. The display device 20 can be a display, a signage and so on. The signage can be a digital signage, an advertising signage, an electronic signage, etc. The user device 30 can be a mobile device, a portable device, a wearable device and so on. For example, the user device 30 can be a smart phone, a tablet, a notebook computer, a laptop, a smart watch, etc. The server 40 can be a cloud server (cloud platform), a network server, a web server, a remote server, a computer host and so on. The number of the masks can be at least two (for example, two, three, four, five, six or more). In an embodiment, three different masks are provided, i.e., a first mask M1, a second mask M2 and a third mask M3. The fourth and above masks (such as the fourth mask, fifth mask, sixth mask and so on) can be analogized according to the content of the following first mask M1 to third mask M3 and are thus not repeated.

The display device 20 can have a light code module 21, at least a driver 22, a light source 23, a panel 24 and so on. The user device 30 can have a camera 31, a screen 32, a processing module 33 and so on. For example, the light code module 21 can be a light code generator (e.g., a light code generation chip/light code generation circuit) or a light code modulator (e.g., a light code modulation chip/light code modulation circuit) for generating or modulating a light code signal A. Alternatively, the light code module 21 can be a visible light generator (e.g., a visible light generation chip/visible light generation circuit) or a visible light modulator (e.g., a visible light modulation chip/visible light modulation circuit) for generating or modulating a visible light signal, and the light code signal A is a visible light signal. The driver 22 can be a light code driver (e.g., a light code driving chip/light code driving circuit), a light source driver (e.g., a light source driving chip/light source driving circuit), or a combination thereof. The light source 23 can be a backlight source, a light source generator, a light source emitter and so on. The camera 31 can be or include a digital camera, a camera lens and so on. The processing module 33 can be a processor (e.g., a central processor/microprocessor), a processing chip, a processing circuit, a processing software, or a combination thereof.

The light code module 21 of the display device 20 can provide the light code signal A to the panel 24 (screen), and the light code signal A can be simply referred to as a light code. The driver 22 can be a light code driver for driving the light code module 21 to generate the light code signal A. Alternatively, the driver 22 can be a light source driver for driving the light source 23 to emit light L. The light source 23 can emit the light L to the first mask M1 and the second mask M2 so as to allow the first mask M1 and the second mask M2 to provide (generate) a first mask signal B1 (e.g., a first space signal) and a second mask signal B2 (e.g., a second space signal), respectively.

The first mask M1 and the second mask M2 can be positioned at a first position P1 and a second position P2 of the panel 24 (screen) of the display device 20, respectively, so as to provide the first mask signal B1 (e.g., first space signal) and the second mask signal B2 (e.g., second space signal), respectively. Further, the first mask M1 and the second mask M2 can divide the page (e.g., advertising page) of the panel 24 (screen) of the display device 20 and superimpose the hidden first mask signal B1 and the second mask signal B2 to the video V, respectively, without affecting the light code signal A (e.g., visible light signal). The first position P1 of the panel 24 can represent a first space, a first block, a first column, or a first page (e.g., a first advertising column or a first advertising page) of the panel 24, and the second position P2 of the panel 24 can represent a second space, a second block, a second column, or a second page (e.g., a second advertising column or a second advertising page) of the panel 24.

The camera 31 of the user device 30 can capture the light code signal A plus the first mask signal B1 (e.g., the first space signal) or the second mask signal B2 (e.g., the second space signal) from the panel 24 (screen) of the display device 20 so as for the user device 30 to obtain a first code C1 (e.g., a first advertising code) according to the combination of the light code signal A and the first mask signal B1 (e.g., the first space signal) or obtain a second code C2 (e.g., a second advertising code) according to the combination of the light code signal A and the second mask signal B2 (e.g., the second space signal), thereby displaying service content D (e.g., first advertising content) corresponding to the first code C1 or service content D (e.g., second advertising content) corresponding to the second code C2 on the screen 32 of the user device 30, as shown in FIG. 2.

Similarly, the third mask M3 can be positioned at a third position P3 of the panel 24 (screen) of the display device 20 so as to provide a third mask signal B3 (e.g., a third space signal). Further, the camera 31 of the user device 30 captures the light code signal A plus the third mask signal B3 (e.g., the third space signal) from the panel 24 (screen) of the display device 20 so as for the user device 30 to obtain a third code C3 (e.g., a third advertising code) according to the combination of the light code signal A and the third mask signal B3 (e.g., the third space signal), thereby displaying service content D (e.g., third advertising content) corresponding to the third code C3 on the screen 32 of the user device 30. Furthermore, the first mask M1 to the third mask M3 can divide the page (e.g., advertising page) of the panel 24 (screen) of the display device 20. The third mask M3 can superimpose the hidden third mask signal B3 to the video V without affecting the light code signal A (e.g., visible light signal). The third position P3 of the panel 24 can represent a third space, a third block, a third column, or a third page (e.g., a third advertising column or a third advertising page) of the panel 24.

The server 40 can receive the first code C1 (e.g., the first advertising code), the second code C2 (e.g., the second advertising code) or the third code C3 (e.g., the third advertising code) from the user device 30 so as to provide the corresponding service content D (e.g., the first advertising content, the second advertising content or the third advertising content) to the user device 30 according to the first code C1, the second code C2 or the third code C3, thereby displaying the corresponding service content D on the screen 32 of the user device 30.

In addition, the user device 30 or the processing module 33 can have a light code decoding unit 34, a mask decoding unit 35 and a computing unit 36. For example, the light code decoding unit 34 can be a light decoder, a light decoding chip, a light decoding circuit, a light decoding software and so on; the mask decoding unit 35 can be a mask decoder, a mask decoding chip, a mask decoding circuit, a mask decoding software and so on; and the computing unit 36 can be an arithmetic logic unit (ALU), a computer, a microcomputer, a computing software, an information analysis software and so on.

The light code decoding unit 34 can decode the light code signal A into light code information A', and the mask decoding unit 35 can decode the first mask signal B1, the second mask signal B2 and the third mask signal B3 into first mask information B1' (e.g., first space information), second mask information B2' (e.g., second space information) and third mask information B3' (e.g., third space information), respectively.

The computing unit 36 can calculate the first code C1 (e.g., the first advertising code) according to the combination of the light code information A' and the first mask information B1' (e.g., the first space information), or calculate the second code C2 (e.g., the second advertising code) according to the combination of the light code information A' and the second mask information B2' (e.g., the second space information), or calculate the third code C3 (e.g., the third advertising code) according to the combination of the light code information A' and the third mask information B3' (e.g., the third space information). For example, the computing unit 36 can perform information analysis or correlation calculation on the combination of the light code information A' and the first mask information B1' so as to obtain the first code C1, perform information analysis or correlation calculation on the combination of the light code information A' and the second mask information B2' so as to obtain the second code C2, or perform information analysis or correlation calculation on the combination of the light code information A' and the third mask information B3' so as to obtain the third code C3.

Figure 3A:
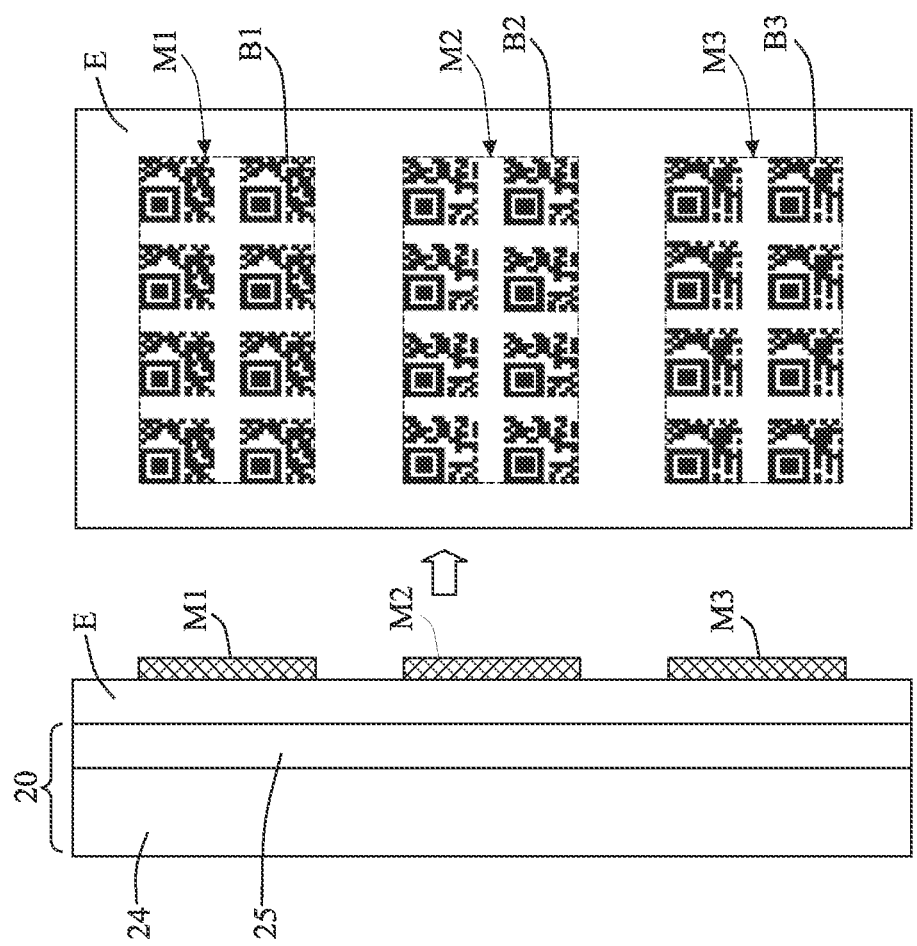
Figure 3B:
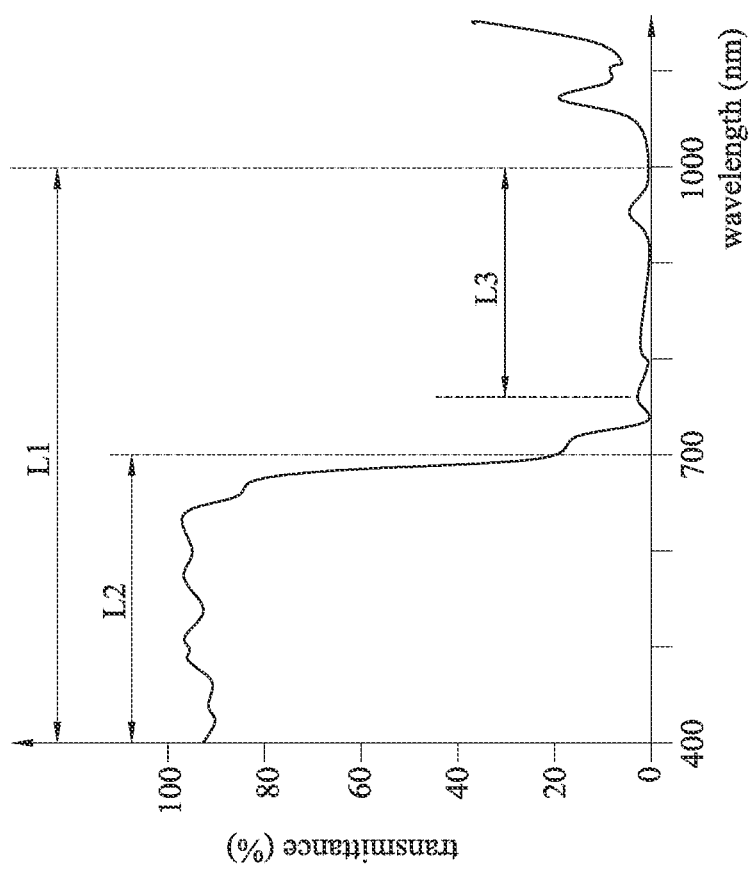
Figure 4:
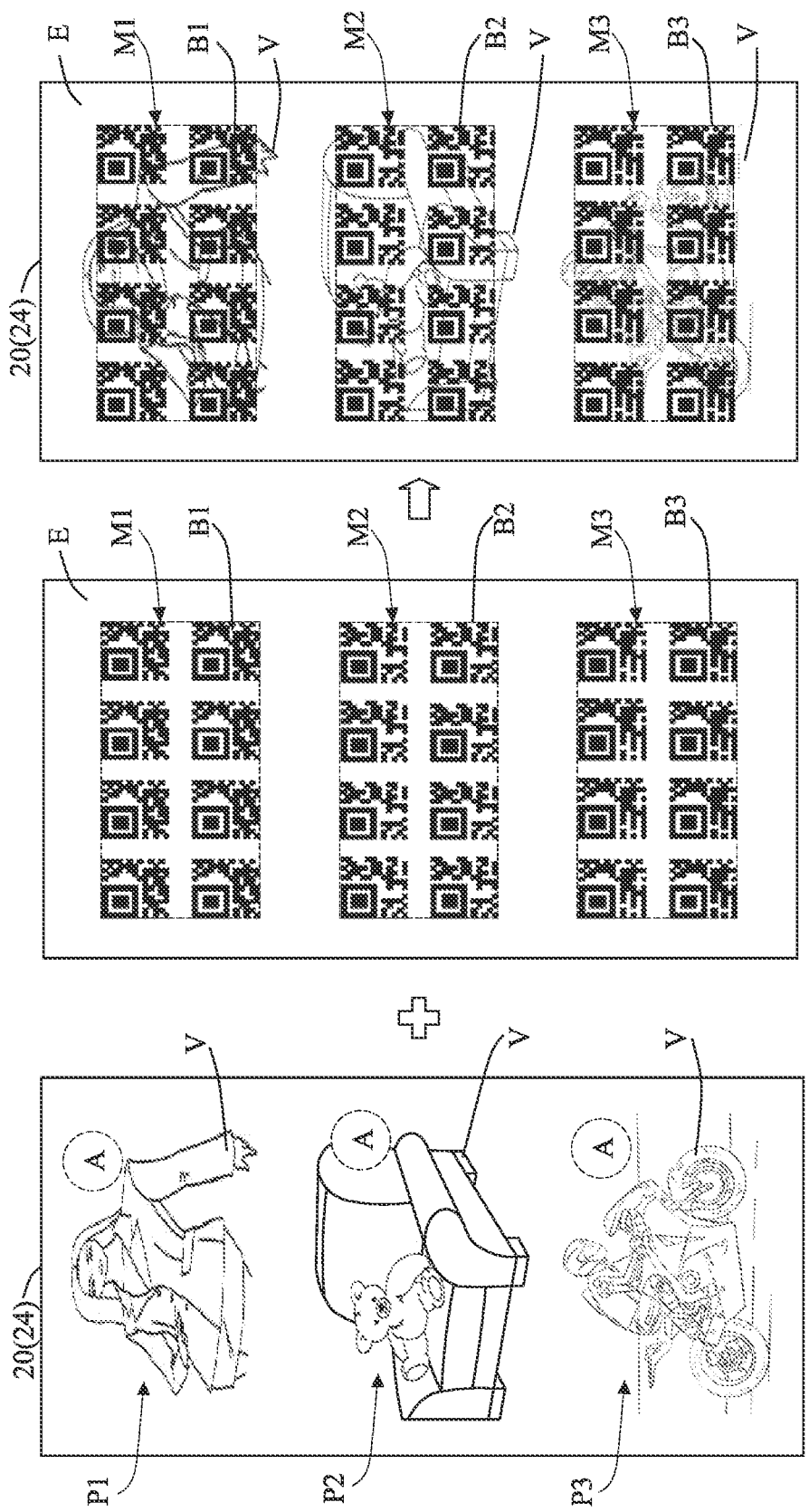

FIGS. 3A and 4 are schematic diagrams showing an embodiment of the display device 20 and the masks (e.g., hardware masks) of the communication system 1 according to the present disclosure. Therein, the left and right sides of FIG. 3A show side and front views, respectively, and FIG. 3B is a graph showing light transmittance versus wavelength of the light L for the masks (e.g., hardware masks) according to the present disclosure. FIGS. 3A to 4 are illustrated with reference to FIGS. 1A and 1B.

Referring to FIGS. 3A and 4, the first mask M1, the second mask M2 or the third mask M3 can be hardware masks and positioned at the first position P1, the second position P2 and the third position P3 of the panel 24 (screen) of the display device 20, respectively. The first mask M1, the second mask M2 and the third mask M3 can be made of an infrared mask thin film, an infrared cut filter (ICF), an infrared watermarking thin film or a polarizer. The first mask M1, the second mask M2 or the third mask M3 can have a grid structure that does not allow infrared light L3 to pass through (e.g., the transmittance of the infrared light L3 is close to 0%), and the grid structure can be formed on a substrate E. Meanwhile, the display device 20 can have a color filter 25 positioned on the panel 24 or between the panel 24 and the substrate E.

Referring to FIGS. 3A and 3B, to avoid disturbing the picture quality of the video V, on the substrate E that allows full frequency light L1 to pass through, a coating layer can be covered or coated and patterned by lithography or etching so as to form the grid structure that does not allow the infrared light L3 to pass through. Further, according to the practical need, different grid structures can form different mask patterns attached onto the panel 24 (screen) of the display device 20.

The substrate E is pervious to the full frequency light L1, and the full frequency light L1 can include or cover visible light L2 and infrared light L3. The first mask M1, the second mask M2 or the third mask M3 (grid structure) on the substrate E can be pervious to the visible light L2 (e.g., the transmittance of the visible light L2 approaches 90% to 100%), and the first mask M1, the second mask M2 or the third mask M3 (grid structure) can block the infrared light L3 (e.g., the transmittance of the infrared light L3 approaches 0%). For example, the full frequency light L1 has a wavelength range of 400 nm to 1000 nm, the visible light L2 has a wavelength range of 400 nm to 700 nm, and the infrared light L3 has a wavelength range of 760 nm to 1000 nm. But the present disclosure is not limited thereto.

In FIG. 4 (or FIG. 5), the video V can be one of a plurality of (e.g., three) different candidate objects, or the video V can be a plurality of (e.g., three) videos with a plurality of (e.g., three) different candidate objects and each video has one candidate object. In addition, the candidate object on the upper left side of FIG. 4 (or FIG. 5) (e.g., a garment or a woman), the candidate object on the middle left side of FIG. 4 (or FIG. 5) (e.g., a sofa or a teddy bear) and the candidate object on the lower left side of FIG. 4 (or FIG. 5) (e.g., a motorcycle or a rider) can be positioned at the first position P1, the second position P2 and the third position P3 of the panel 24 (screen) of the display device 20, respectively, so as to correspond to the first mask M1, the second mask M2 and the third mask M3, respectively.

When a user scans a candidate object displayed on the panel 24 of the display device 20 with the camera 31 (lens) of the user device 30 (e.g., a mobile device), the infrared light L3 at the pattern portion (e.g., the grid structure) of the first mask M1, the second mask M2 or the third mask M3 (e.g., the hardware mask of FIG. 4) will be blocked by the first mask M1, the second mask M2 or the third mask M3. Therefore, the camera 31 (lens) of the user device 30 can capture the first mask signal B1 of the first mask M1, the second mask signal B2 of the second mask M2, or the third mask signal B3 of the third mask M3. Then, the user device 30 can perform signal analysis or correlation calculation on the light code signal A and the mask signal (e.g., the first mask signal B1, the second mask signal B2 or the third mask signal B3) so as to restore the code (e.g., the first code C1, the second code C2 or the third code C3) corresponding to the candidate object (e.g., advertisement of interest to the user) scanned by the user device 30. Thereafter, the user device 30 can transmit the code to the server 40 (e.g., a cloud server) that searches the service content D (e.g., advertising content) corresponding to the code and then transmits the service content D to the user device 30. The service content D can then be displayed on the screen 32 of the user device 30.

Figure 5:
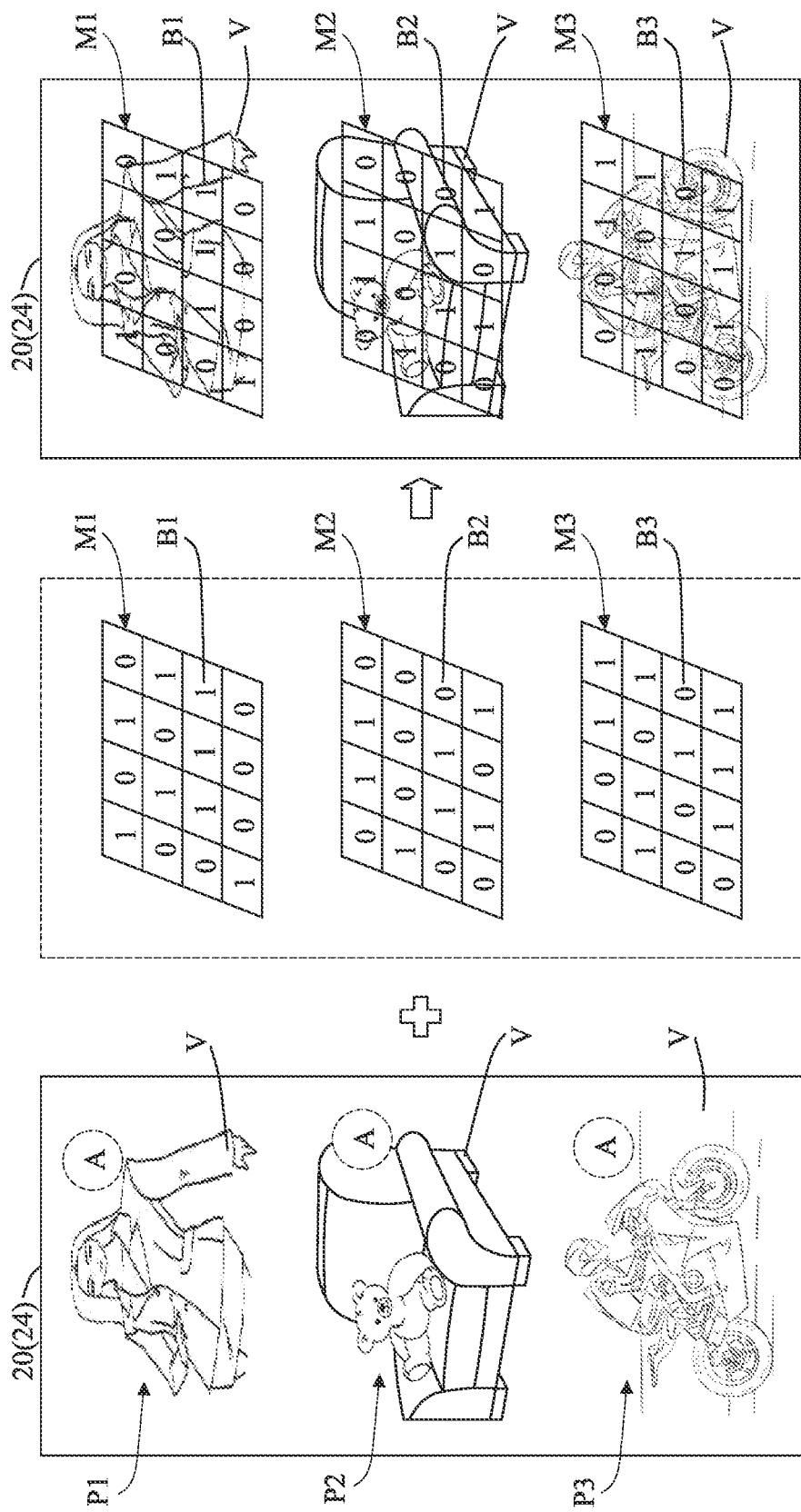
FIG. 5 is a schematic diagram showing an embodiment of the display device and masks (e.g., software masks) in the communication system according to the present disclosure.

FIG. 5 is a schematic diagram showing an embodiment of the display device 20 and the masks (e.g., software masks) of the communication system 1 according to the present disclosure and is illustrated with reference to FIGS. 1A and 1B.

Referring to FIG. 5, the first mask M1, the second mask M2 or the third mask M3 can be a software mask (i.e., a digital mask), and the software mask (digital mask) can be hidden information. The hidden information can be embedded through an image processing technique (e.g., digital image processing technique) in the video V displayed by the panel 24 (screen) of the display device 20. For example, the hidden information is superimposed into a transparent layer (an alpha channel) of the video V, and both the video V and the hidden information are displayed on the panel 24 (screen) of the display device 20. As such, the hidden information does not affect the play of the video V, but provides (transmits) the first mask information B1', the second mask information B2' or the third mask information B3' (e.g., space information). For example, the software mask can be, but not limited to, a video invisible mark, a quick response (QR) code, a barcode, a figure or a mark.

When the user scans a candidate object displayed on the panel 24 of the display device 20 with the camera 31 (lens) of the user device 30 (e.g., a mobile device), the user device 30 can detect the transparent layer (e.g., brightness of the transparent layer) of the video V so as to capture the first mask signal B1 of the first mask M1, the second mask signal B2 of the second mask M2 or the third mask signal B3 of the third mask M3. Then, the user device 30 can perform signal analysis or correlation calculation on the light code signal A and the mask signal (e.g., the first mask signal B1, the second mask signal B2 or the third mask signal B3) so as to restore the code (e.g., the first code C1, the second code C2 or the third code C3) corresponding to the candidate object (e.g., advertisement of interest to the user) scanned by the user device 30. Thereafter, the user device 30 can transmit the code to the server 40 (e.g., a cloud server) that searches the service content D (e.g., advertising content) corresponding to the code and then transmits the service content D to the user device 30. The service content D can then be displayed on the screen 32 of the user device 30.

Figure 6:
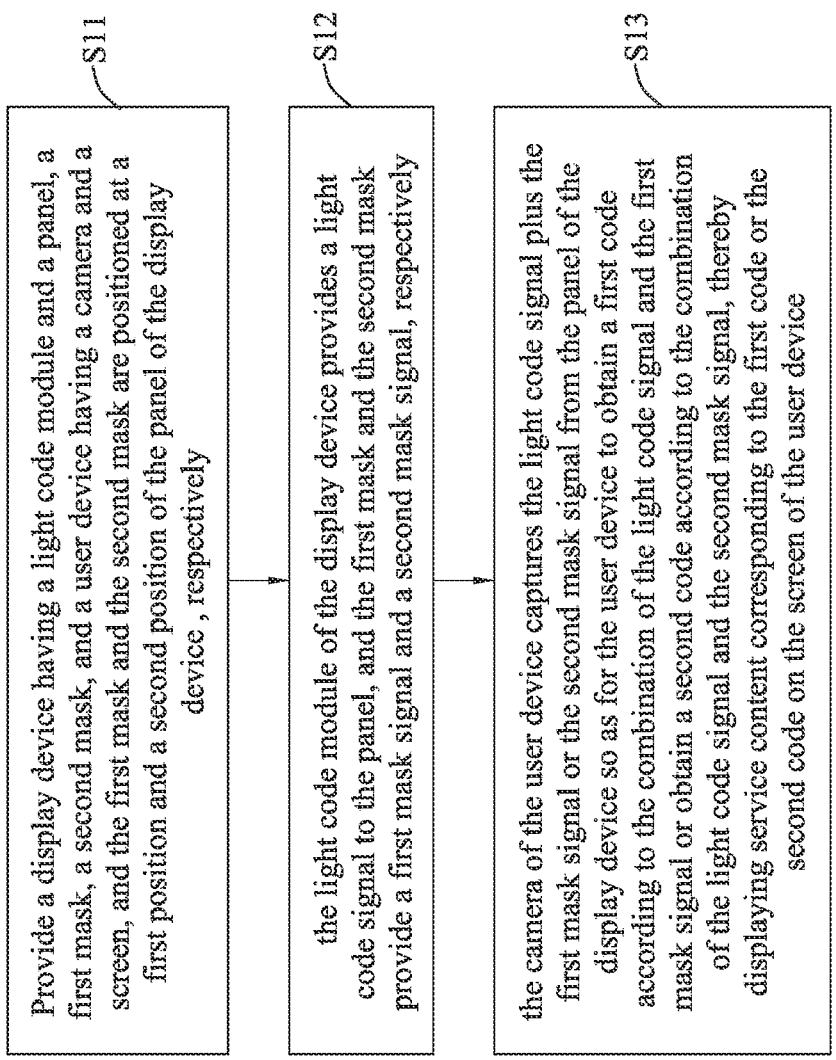
FIG. 6 is a schematic flow diagram of a communication method according to the present disclosure.

FIG. 6 is a schematic flow diagram of a communication method according to the present disclosure and is illustrated with reference to FIGS. 1A to 5. The main content of the communication method is described as follows, and the contents that are the same as FIGS. 1A to 5 will not be repeated.

Referring to FIG. 6, at step S11, a display device 20 having a light code module 21 and a panel 24 (screen), a first mask M1, a second mask M2, and a user device 30 having a camera 31 and a screen 32 are provided, and the first mask M1 and the second mask M2 are positioned at a first position P1 and a second position P2 of the panel 24 (screen) of the display device 20, respectively.

At step S12 of FIG. 6, the light code module 21 of the display device 20 provides a light code signal A to the panel 24 (screen), and the first mask M1 and the second mask M2 provide a first mask signal B1 and a second mask signal B2, respectively.

At step S13 of FIG. 6, the camera 31 of the user device 30 captures the light code signal A plus the first mask signal B1 or the second mask signal B2 from the panel 24 (screen) of the display device 20 so as for the user device 30 to obtain a first code C1 according to the combination of the light code signal A and the first mask signal B1 or obtain a second code C2 according to the combination of the light code signal A and the second mask signal B2, thereby displaying service content D corresponding to the first code C1 or the second code C2 on the screen 32 of the user device 30.

The communication method further comprises: providing a third mask M3 positioned at a third position P3 of the panel 24 (screen) of the display device 20 so as to provide a third mask signal B3; and the camera 31 of the user device 30 capturing the light code signal A plus the third mask signal B3 from the panel 24 (screen) of the display device 20 so as for the user device 30 to obtain a third code C3 according to the combination of the light code signal A and the third mask signal B3, thereby displaying service content D corresponding to the third code C3 on the screen 32 of the user device 30.

The communication method further comprises: a light source 23 of the display device 20 emitting light L to the first mask M1, the second mask M2 and the third mask M3 so as to cause the first mask M1, the second mask M2 and the third mask M3 to provide (generate) the first mask signal B1, the second mask signal B2 and the third mask signal B3, respectively.

The first mask M1, the second mask M2 or the third mask M3 can be hardware masks and positioned at the first position P1, the second position P2 and the third position P3 of the panel 24 (screen) of the display device 20, respectively, and the first mask M1, the second mask M2 or the third mask M3 can be made of an infrared mask thin film, an infrared cut filter, an infrared watermarking thin film or a polarizer. In addition, the first mask M1, the second mask M2 or the third mask M3 (e.g., a hardware mask) can be fabricated by coating a coating layer on a substrate E and patterning the coating layer through lithography or etching so as to form a grid structure impervious to infrared light L3. Further, according to the practical need, different grid structures can have different mask patterns attached to the panel 24 (screen) of the display device 20.

Furthermore, the first mask M1, the second mask M2 or the third mask M3 can be a software mask that is hidden information embedded through an image processing technique in a video V displayed by the panel 24 (screen) of the display device 20. In addition, the first mask M1, the second mask M2 or the third mask M3 (e.g., a software mask) can be a video invisible mark, a QR code, a barcode, a figure or a mark.

The communication method further comprises: a light code decoding unit 34 of the user device 30 decoding the light code signal A into light code information A'; and a mask decoding unit 35 of the user device 30 decoding the first mask signal B1, the second mask signal B2 and the third mask signal B3 into first mask information B1', second mask information B2' and third mask information B3', respectively. Meanwhile, a computing unit 36 of the user device 30 calculates the first code C1 according to the combination of the light code information A' and the first mask information B1', or calculates the second code C2 according to the combination of the light code information A' and the second mask information B2', or calculates the third code C3 according to the combination of the light code information A' and the third mask information B3'.

The communication method further comprises: a server 40 receiving the first code C1, the second code C2 or the third code C3 from the user device 30 so as to provide the corresponding service content D to the user device 30 according to the first code C1, the second code C2 or the third code C3, thereby displaying the corresponding service content D on the screen 32 of the user device 30.

Figure 7:
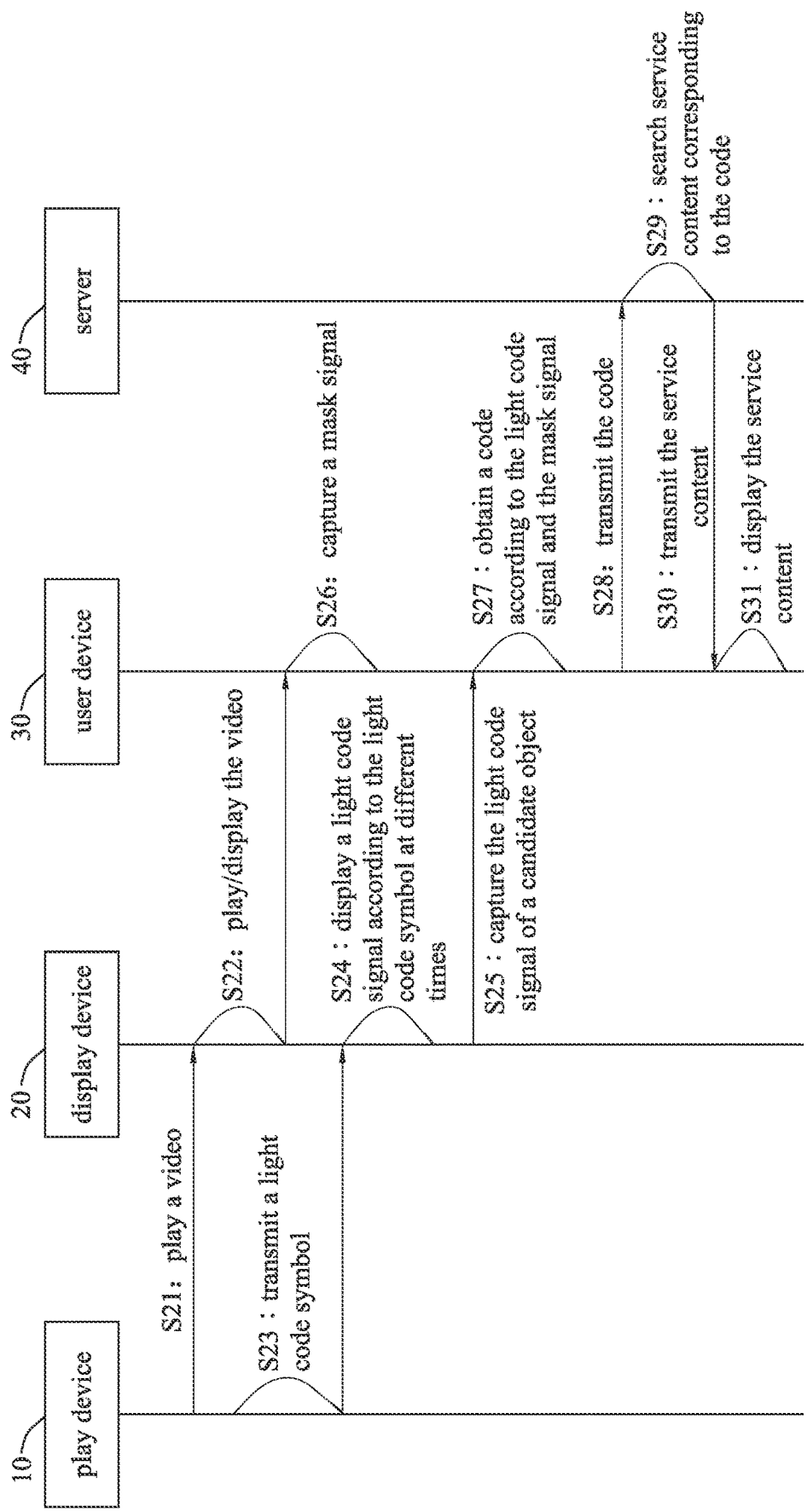
FIG. 7 is another schematic flow diagram of the communication method according to the present disclosure.

FIG. 7 is another schematic flow diagram of the communication method according to the present disclosure, and is illustrated with reference to FIGS. 1A and 1B.

Referring to FIG. 7, at steps S21 to S22, the play device 10 plays a video V and the panel 24 (screen) of the display device 20 displays the video V played by the play device 10.

At steps S23 to S24 of FIG. 7, the play device 10 transmits a light code symbol or light code symbol parameter associated with a light code signal A (i.e., light code), and the panel 24 (screen) of the display device 20 displays the light code signal A according to the light code symbol or light code symbol parameter at different times (different time periods).

At steps S25 to S26 of FIG. 7, the user device 30 captures the light code signal A of a candidate object of interest to the user from the video V displayed by the panel 24 (screen) of the display device 20, and also captures a mask signal (e.g., a first mask signal B1, a second mask signal B2 or a third mask signal B3) from the panel 24 (screen) of the display device 20. For example, the candidate object can be a garment (woman), a sofa (teddy bear) or a motorcycle (rider) shown on the left side of FIG. 4 or FIG. 5.

At steps S27 to S28 of FIG. 7, the user device 30 obtains a code (e.g., a first code C1, a second code C2 or a third code C3) according to the captured light code signal A and mask signal (e.g., the first mask signal B1, the second mask signal B2 or the third mask signal B3) and transmits the code to the server 40 (e.g., a cloud server or cloud platform).

At steps S29 to S31 of FIG. 7, the server 40 searches service content D (e.g., first advertising content, second advertising content or third advertising content) corresponding to the code (e.g., the first code C1, the second code C2 or the third code C3) and transmits the service content D corresponding to the code to the user device 30. The service content D corresponding to the code is then displayed on the screen 32 of the user device 30.

Therefore, the communication system and method of the present disclosure at least has following features, advantages or technical effects.

1. Since communication using a light code signal (e.g., visible light communication using a visible light signal) has advantages of directionality and not easy to be shielded, the display device (e.g., a digital signage) can provide a light code signal (e.g., a visible light signal) so as to have both display and information transmission functions.

2. The light code signal (light code information) of the display device of the present disclosure can be combined with mask signals (mask information) of a plurality of masks to obtain a plurality of codes (e.g., advertising codes), thereby displaying service content (e.g., advertising content) (of interest to the user) corresponding to the codes on the screen of the user device.

3. One panel of the display device of the present disclosure can provide a plurality of codes (e.g., advertising codes) so as to avoid increasing the cost of the display device and further allow the user to choose service content of interest (e.g., advertising content) through the user device.

4. The present disclosure provides at least two mask signals or mask information (e.g., space information) through at least two masks (e.g., hardware or software masks) so as to allow the user to read information of interest (e.g., service content) through the user device (e.g., a smart phone), thereby improving the service efficiency of the display device (e.g., advertising efficiency or marketing activity efficiency).

Therefore, according to the communication system and method thereof of the present disclosure, since communication using a light code signal has directionality and is not easy to be shielded, the display device can provide a light code signal so as to have both display and information transmission functions. Further, the light code signal of the display device can be combined with mask signals of a plurality of masks to obtain a plurality of codes, thereby displaying service content corresponding to the codes on the screen of the user device. Meanwhile, one panel of the display device can provide a plurality of codes, thus avoiding increasing the cost of the display device and further allowing the user to choose service content of interest through the user device. Furthermore, the present disclosure provides at least two mask signals (or mask information) through at least two masks so as to allow the user to read information of interest through the user device, thereby improving the service efficiency of the display device.

The above-described descriptions of the detailed embodiments are only to illustrate the preferred implementation according to the present disclosure, and it is not to limit the scope of the present disclosure. Accordingly, all modifications and variations completed by those with ordinary skill in the art should fall within the scope of present disclosure defined by the appended claims.

What is claimed is:

1. A communication system, comprising:
   a display device having a panel and a light code module providing a light code signal to the panel;
   a first mask and a second mask positioned at a first position and a second position of the panel of the display device, respectively, for providing a first mask signal and a second mask signal, respectively, wherein the panel provides both the light code signal plus the first mask signal and the light code signal plus the second mask signal; and
   a user device having a camera and a screen, wherein the camera of the user device captures one or both the light code signal of the light code module plus the first mask signal of the first mask and the light code signal of the light code module plus the second mask signal of the second mask from the panel of the display device, such that the user device obtains one or both a first code according to a combination of the light code signal of the light code module plus the first mask signal of the first mask and a second code according to a combination of the light code signal of the light code module plus the second mask signal of the second mask, thereby displaying one or both first service content corresponding to the first code according to the combination of the light code signal of the light code module plus the first mask signal of the first mask and second service content corresponding to the second code according to the combination of the light code signal of the light code module plus the second mask signal of the second mask on the screen of the user device.

2. The communication system of claim 1, wherein the display device further has a light source for emitting light to the first mask and the second mask to cause the first mask and the second mask to provide the first mask signal and the second mask signal, respectively.

3. The communication system of claim 1, wherein the first mask or the second mask is a hardware mask positioned on the panel of the display device, and is made of an infrared mask thin film, an infrared cut filter, an infrared watermarking thin film or a polarizer.

4. The communication system of claim 1, wherein the first mask or the second mask is a hardware mask having an infrared light-proof grid structure.

5. The communication system of claim 1, wherein the first mask or the second mask is a software mask that is hidden information embedded through an image processing technique in a video displayed by the panel of the display device.

6. The communication system of claim 1, wherein the first mask or the second mask is a software mask that is a video invisible mark, a quick response (QR) code, a barcode, a figure or a mark.

7. The communication system of claim 1, further comprising a third mask positioned at a third position of the panel of the display device for providing a third mask signal, wherein the camera of the user device captures the light code signal plus the third mask signal from the panel of the display device, such that the user device obtains a third code according to a combination of the light code signal and the third mask signal, thereby displaying third service content corresponding to the third code on the screen of the user device.

8. The communication system of claim 1, wherein the user device further comprises:
a light code decoding unit for decoding the light code signal into light code information; and
a mask decoding unit for decoding the first mask signal and the second mask signal into first mask information and second mask information, respectively.

9. The communication system of claim 8, wherein the user device further comprises a computing unit for calculating the first code according to a combination of the light code information and the first mask information or calculating the second code according to a combination of the light code information and the second mask information.

10. The communication system of claim 1, further comprising a server for receiving the first code or the second code from the user device to provide the first service content or the second service content to the user device according to the first code or the second code, thereby displaying the first service content or the second service content on the screen of the user device.

11. A communication method, comprising:
providing a first mask, a second mask, a user device having a screen and a display device having a light code module and a panel, wherein the first mask and the second mask are positioned at a first position and a second position of the panel of the display device, respectively;
providing a light code signal by the light code module of the display device to the panel, and providing a first mask signal and a second mask signal by the first mask and the second mask, respectively, wherein the panel provides both the light code signal plus the first mask signal and the light code signal plus the second mask signal; and
capturing one or both the light code signal of the light code module plus the first mask signal of the first mask and the light code signal of the light code module plus the second mask signal of the second mask from the panel of the display device by the user device, wherein the user device obtains one or both a first code according to a combination of the light code signal of the light code module plus the first mask signal of the first mask and a second code according to a combination of the light code signal of the light code module plus the second mask signal of the second mask, thereby displaying one or both first service content corresponding to the first code according to the combination of the light code signal of the light code module plus the first mask signal of the first mask and second service content corresponding to the second code according to the combination of the light code signal of the light code module plus the second mask signal of the second mask on the screen of the user device.

12. The communication method of claim 11, further comprising:
emitting light by a light source of the display device to the first mask and the second mask to cause the first mask and the second mask to provide the first mask signal and the second mask signal, respectively.

13. The communication method of claim 11, wherein the first mask or the second mask is a hardware mask positioned on the panel of the display device, and is made of an infrared mask thin film, an infrared cut filter, an infrared watermarking thin film or a polarizer.

14. The communication method of claim 11, wherein the first mask or the second mask is a hardware mask that is fabricated by coating a coating layer on a substrate and patterning the coating layer through lithography or etching to form an infrared light-proof grid structure.

15. The communication method of claim 11, wherein the first mask or the second mask is a software mask that is hidden information embedded through an image processing technique in a video displayed by the panel of the display device.

16. The communication method of claim 11, wherein the first mask or the second mask is a software mask that is a video invisible mark, a quick response (QR) code, a barcode, a figure or a mark.

17. The communication method of claim 11, further comprising:
providing a third mask positioned at a third position of the panel of the display device to provide a third mask signal; and
capturing the light code signal plus the third mask signal from the panel of the display device by the user device to obtain a third code according to a combination of the light code signal and the third mask signal, thereby displaying third service content corresponding to the third code on the screen of the user device.

18. The communication method of claim 11, further comprising:
by the user device, decoding the light code signal into light code information and decoding the first mask signal and the second mask signal into first mask information and second mask information, respectively.

19. The communication method of claim 18, further comprising:
by the user device, calculating the first code according to a combination of the light code information and the first mask information or calculating the second code according to a combination of the light code information and the second mask information.

20. The communication method of claim 11, further comprising:
receiving the first code or the second code from the user device by a server to provide the first service content or the second service content to the user device according to the first code or the second code, thereby displaying the first service content or the second service content on the screen of the user device.

* * * * *